Figure 1:
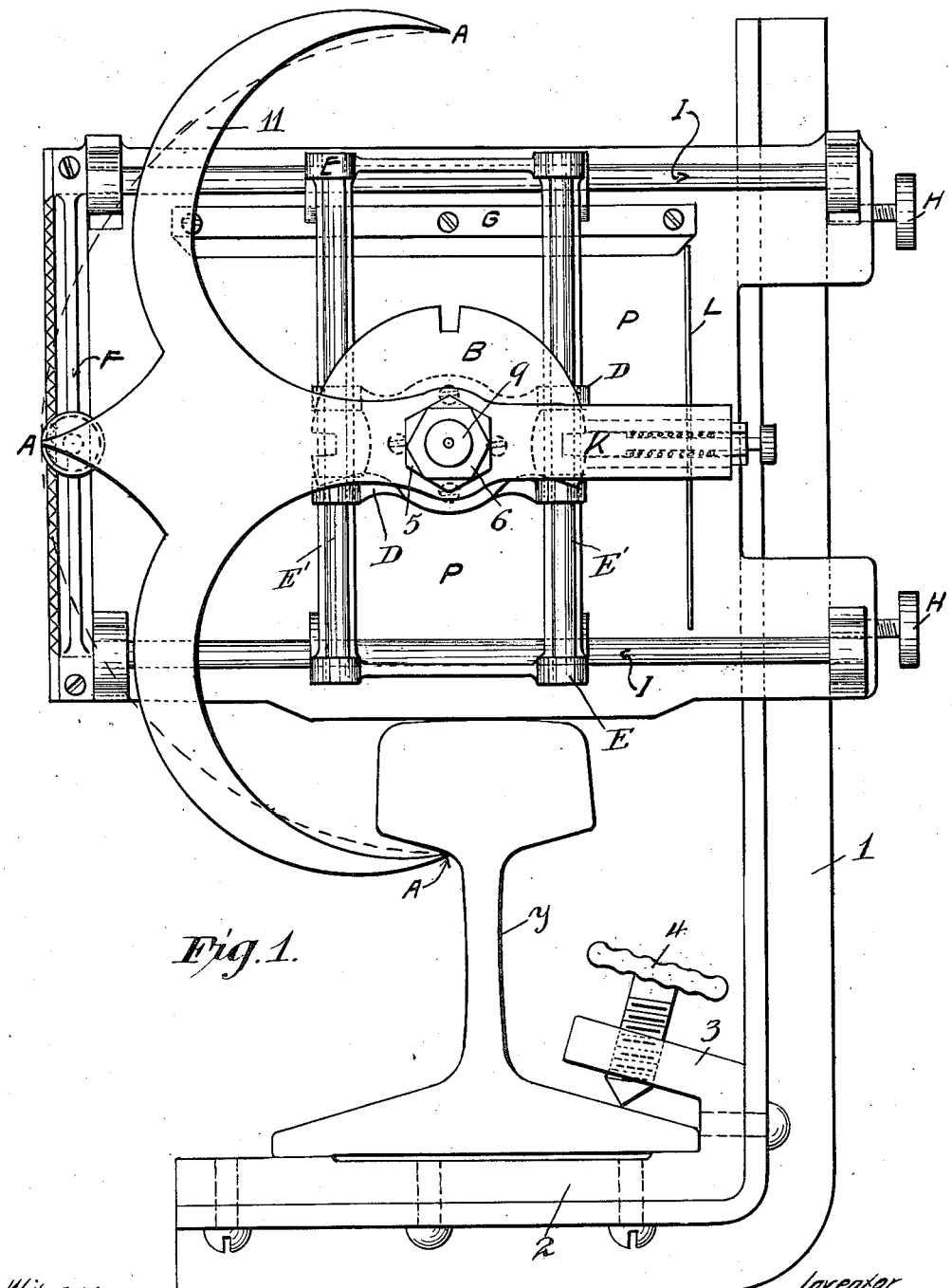

C. W. BALDRIDGE.
CONTOUR RECORDER.
APPLICATION FILED OCT. 20, 1913.
1,154,596.
Patented Sept. 28, 1915.
3 SHEETS—SHEET 2.
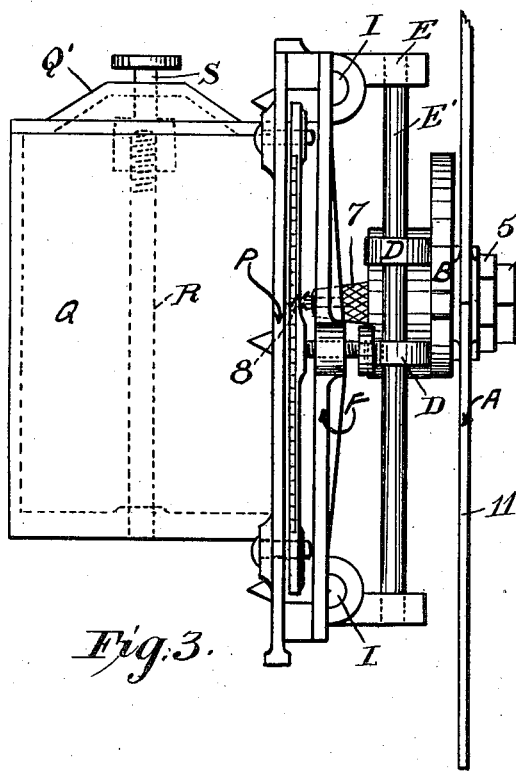
Fig. 3.
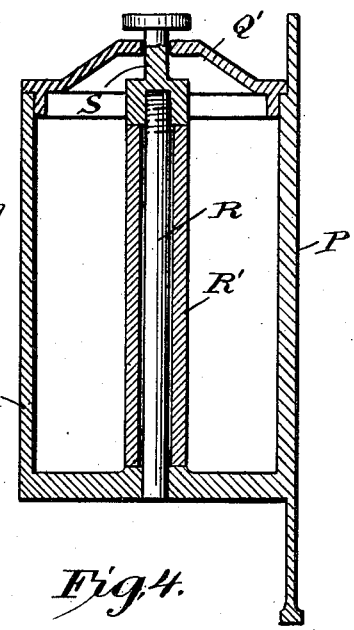
Fig. 4.
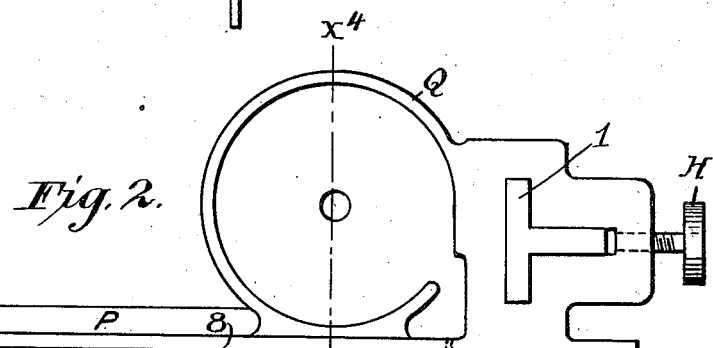
Fig. 2.
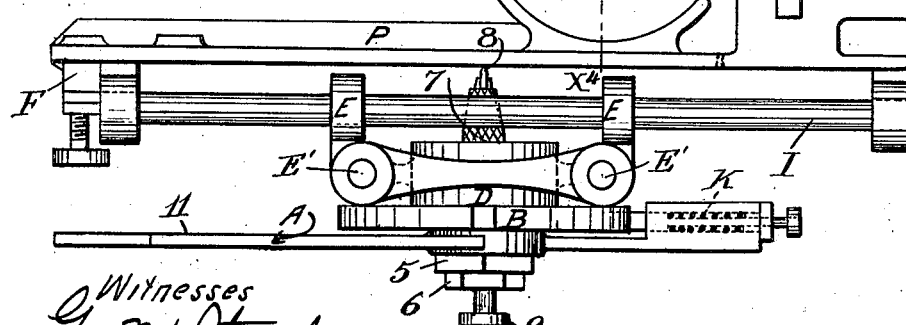

C. W. BALDRIDGE.
CONTOUR RECORDER.
APPLICATION FILED OCT. 20, 1913.
1,154,596.
Patented Sept. 28, 1915.
3 SHEETS—SHEET 3.
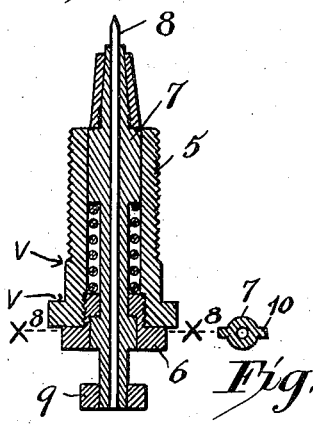
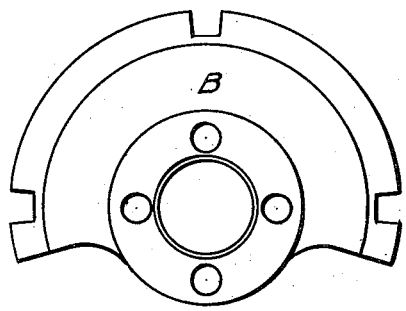
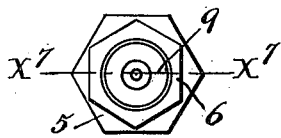
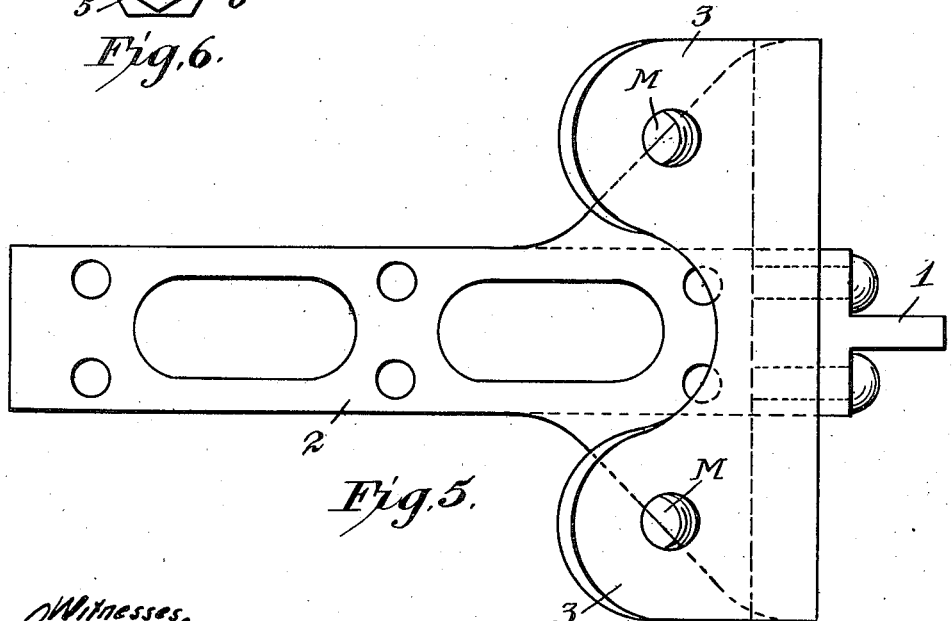

UNITED STATES PATENT OFFICE.

CHARLES W. BALDRIDGE, OF CHICAGO, ILLINOIS.

CONTOUR-RECORDER.

1,154,596.　　　　Specification of Letters Patent.　　Patented Sept. 28, 1915.

Application filed October 20, 1913.　Serial No. 796,243.

*To all whom it may concern:*

Be it known that I, CHARLES W. BALDRIDGE, a citizen of the United States, residing at Chicago, in the county of Cook and State of Illinois, have invented a new and useful Contour-Recorder, of which the following is a specification.

My invention has for its object to provide a simple and highly efficient contour tracer and recorder adapted for use to trace the contour or cross-sectional lines of various objects, but especially adapted for use to trace and record the cross-section contour of railway rails.

Generally stated, the invention consists of the novel devices and combinations of devices hereinafter described and defined in the claims.

For the accomplishment of the objects above generally indicated, various different devices have been proposed, but so far as I am aware, all such tracing instruments which are adapted for use to trace the cross-sectional contour of a railway rail, or similar irregular form, have involved the use of the pantograph. In some instances, a single tracer adapted to trace, for example, one face of a rail, or the contour of the wheel tread, has been mounted for a compound sliding movement, but such single point tracer could not be used to trace the opposite sides and tread of a railway rail, for example, for the reason that such tracing requires a tracer having two or more tracing points.

In at least one instance, a tracing instrument employing a pantograph has been provided with a tracer having three points, any one of which points may be used in the tracing operation, but in which the movement of the several tracing points, in succession, to a certain common fixed point on the article being traced, will produce a movement of the scribing point or stylus.

In my improved tracing instrument, I provide a tracer which has a plurality of arms with tracing points that are located equi-distant from and are arranged to rotate around the axis of the scribing point or stylus; the said scribing point or stylus is mounted for compound movement in the plane of the contour to be traced; and means is provided for locking the said tracer against rotary movement on the axis of the stylus, and in respect to the part which carries the scribing point. The part which carries the scribing point is preferably in the form of a cross-head mounted for straight line movement on a carriage, which, in turn, is mounted on suitable guides for sliding movements at a right angle to the direction of sliding movement of the said cross-head. A suitable standard or support for the tracing and recording instrument proper, is provided with means for engagement with the base flange of a rail, or the like, so that the tracing points will be held for movement in a plane at an exact right angle to the rail.

In the accompanying drawings which illustrate the invention, like characters indicate like parts throughout the several views.

Referring to the drawings: Figure 1 shows the contour recorder in elevation applied to a standard rail, the cross-section of said rail being diagrammatically indicated; Fig. 2 is a plan view of the recorder; Fig. 3 is an elevation looking at the recorder in a direction from left toward the right in respect to Fig. 1; Fig. 4 is a vertical section taken approximately on the line $x^4$ $x^4$ on Fig. 2; Fig. 5 is a plan view of the standard at its base; Fig. 6 is a front end elevation of the scribing head and scribing point or stylus; Fig. 7 is a section taken on the line $x^7$ $x^7$ on Fig. 6; Fig. 8 is a detail in section showing certain parts sectioned on the line $x^8$ $x^8$ on Fig. 7; and Fig. 9 is a front elevation of an arch plate which constitutes one of the elements for locking the tracer in different positions.

The cross-section of a standard railway rail Y is shown in Fig. 1. The supporting standard 1, as shown, is made from a metallic T-bar bent into L-shape form so that it has a vertical and horizontal portion. For engagement with the base flange of the rail, the said standard is provided with a base plate 2 rigidly secured to the horizontal portion thereof, and provided, adjacent to the standard, with a clamping flange 3 that overlies the adjacent side of the base flange of the rail and is provided with sharp pointed clamping screws 4, the points of which impinge on the base flange of the rail, as best shown in Fig. 1.

A frame, as shown, in the form of a face plate P is mounted for true straight line vertical sliding movements on the vertical portion of the standard 1 and is adapted to be held in different adjustments, preferably with its lower edge resting on the top of the rail, by means of set screws H. Cast integral with, or otherwise rigidly secured to the face plate P is a cylindrical paper roll container Q provided within with an axially disposed vertical spindle R rigidly secured at its lower end to the bottom thereof. The receptacle Q is provided with a removable cover $Q^1$ that is equipped with a vertical movable rotary clamping spindle S that is adapted to be screwed onto the threaded upper end of the spindle R.

$R^1$ indicates a sleeve or spool on which a roll of paper is adapted to be wound, and which is itself loosely journaled on the spindle R.

In the face plate P is a slot L through which the recording paper may be drawn outward from the cylinder Q and passed over the face plate P under the straight edge G, to the outer vertical edge of the said face plate, where it is clamped against the face plate by a screw actuated clamping bar F. Thus the paper exposed for the record is accurately held against the face plate, above the rail, and in a plane that is at a right angle both in a vertical and horizontal direction to the longitudinal axis of the rail.

The face plate P has outstanding lugs which support vertically spaced parallel horizontal guide rods 1. A carriage E is mounted to slide horizontally on the guide rods 1 and is provided with outstanding lugs to which parallel vertical guide rods $E^1$ are secured at their upper and lower ends. A cross-head D is mounted to slide vertically on the vertical guide rods $E^1$.

A sleeve-like hub 5 is screw-threaded into the central portion of the cross-head D, and in one end is provided with an annular cap 6. Working within the hub 5 is a stylus, which, as shown, comprises a spring-pressed tubular holder 7 having an axially projected scribing point such as a graphite pencil 8. The tubular holder 7 is provided with an operating head 9 and with laterally projecting lugs 10, which latter are shown in Figs. 7 and 8 and which are adapted to engage the cap 6 and hold the pencil or tracing point retracted, when the said holder 7 is drawn against the tension of its spring and slightly rotated.

An arch plate or lock segment B is rigidly secured to the cross-head D with its periphery extended concentric to the axis of the scribing head and its scribing point.

The tracer, which is preferably in the form of an arm or lever 11, is intermediately pivoted on that portion of the sleeve-like hub 5 which is between the points marked V—V on Fig. 7. At one end, the said tracing lever 11 is provided with three arms terminating in three tracing points A. Preferably, these tracing arms and points are in by-symmetrical arrangement, and they are, as already indicated, located equidistant from the axis of the scribing point or stylus.

At its other end, the tracing lever 11 is provided with a spring-pressed lock K that is adapted to engage with any one of three notches of the arch plate B.

In the construction described, the tracing points A—A—A are located ninety degrees apart, and the lock notches in the arch plate B are, consequently, correspondingly located ninety degrees apart.

When the device is to be used, the tracing lever 11 is located in one or the other of its three different positions, so that it is held against movement, in respect to, and for common movements with the cross-head D, which carries the scribing point. Hence, it is evident that when this tracing lever is thus locked to the cross head, and one or the other of its tracing points is moved over the cross section of the contour of the rail, the scribing point will be given an exact corresponding movement, so that it will mark upon the paper, the exact contour of the rail. Obviously, the above movement of the scribing point is the same, regardless of which of the tracing points is moved into action, and furthermore, shifting of the one tracing point out of action and another into action does not at all change the position of the said scribing point.

To illustrate, assume a predetermined point on a rail or elsewhere, and it will be seen that the tracing lever may be moved pivotally so as to carry its several tracing points, in succession, into engagement with the said assumed fixed point, without imparting any movement, whatever, to the scribing point. The several tracing points and variously formed arms on the tracing lever are, however, very important, because, by the use thereof, articles, such as rails and which have very irregular cross-sections, may be traced. Obviously, this tracing and recording device does not operate like a pantograph to increase or decrease the size of the article traced, but always gives a traced outline that is an exact duplicate of the surface traced.

What I claim is:

1. In a contour recorder, the combination with a head and guides therefor holding the same for straight line sliding movements in two directions of a common plane, of a stylus projecting from, carried by and movable with said head, a tracer carried by said head but mounted for pivotal movements in respect thereto around the axis of said stylus and provided with a plurality of tracing points, and means for locking said tracer to said head in different pivotally adjusted positions.

2. The combination with a frame having means for supporting a tracing sheet, of an upright supporting said frame with freedom for vertical adjustments, and provided with means for attachment to a rail with the said frame in position to hold the tracing sheet in a plane at a right angle to the rail, horizontal guides on said frame, a carriage mounted for sliding movements on said horizontal guides and having vertical guides, a cross-head mounted for sliding movements on said vertical guides, a stylus carried by said cross-head, a tracing lever attached to said cross-head and mounted for pivotal adjustments around the axis of said stylus, said tracing lever having a plurality of tracing points located equidistant from the axis of said stylus, and means for locking said lever in different pivotally adjusted positions, corresponding to the different positions in which the several tracing points will be brought to a common relatively fixed point.

C. W. BALDRIDGE.

Witnesses:
  GEO. M. STRACHAN,
  J. DE N. MACOMB, Jr.